United States Patent [19]

LoCicero et al.

[11] Patent Number: 4,694,328
[45] Date of Patent: Sep. 15, 1987

[54] RECOMBINATION OF LOW- AND HIGH-RESOLUTION SEGMENTS OF AN EXTENDED ASPECT RATIO PICTURE

[75] Inventors: Joseph L. LoCicero, Riverside; Melih Pazarci, Chicago; Theodore S. Rzeszewski, Lombard, all of Ill.

[73] Assignee: American Telephone and Telegraph Company, AT&T Bell Laboratories, Murray Hill, N.J.

[21] Appl. No.: 684,488

[22] Filed: Dec. 21, 1984

[51] Int. Cl.$^4$ .................. H04N 9/64; H04N 7/08; H04N 11/20; H04N 5/208

[52] U.S. Cl. .................. 358/21 V; 358/37; 358/166; 358/12; 358/141

[58] Field of Search .................. 358/21 V, 21 R, 12, 358/141, 11, 36, 37, 166, 167

[56] References Cited

U.S. PATENT DOCUMENTS

| | | | |
|---|---|---|---|
| 4,152,721 | 5/1979 | Kim | 358/21 V |
| 4,335,396 | 6/1982 | Rzeszewski | 358/21 V |
| 4,564,857 | 1/1986 | LoCicero et al. | 358/11 |

FOREIGN PATENT DOCUMENTS 2132846  7/1984  United Kingdom .................. 358/12

OTHER PUBLICATIONS

"Compatible Systems for High-Quality Television", *SMPTE J.*, R. N. Jackson and M. J. J. C. Annegarn, vol. 92, No. 7, pp. 719-723, Jul. 1983.
"Extended Definition Television with High Picture Quality", *SMPTE J.*, B. Wendland, vol. 92, No. 10, pp. 1028-1035, Oct. 1983.
"The Problems and Promises of High-Definition Television", IEEE Spectrum, R. K. Jurgen, vol. 20, No. 12, pp. 46-51, Dec. 1983.
"An Evolutionary Approach to High Definition Television", in *Proc. 16th Annual SMPTE Television Conference (Tomorrow's Television)*, C. W. Rhodes, pp. 186-197, Feb. 1982.
"A Compatible High Fidelity TV Standard for Satellite Broadcasting", in *Proc. 16th Annual SMPTE Television Conference (Tomorrow's Television)*, T. W. Robson, pp. 218-236, Feb. 1982.
"High Definition Television Systems: Desirable Standards, Signal Forms, and Transmission Systems", *IEEE Trans. Comm.*, T. Fujio, vol. COM-29, No. 12, pp. 1882-1890, Dec. 1981.
"System Concepts in High Fidelity Television", by R. N. Jackson and S. L. Tan, IBC '82 Convention Record, Sep. 1982, pp. 135-139.

*Primary Examiner*—James J. Groody
*Assistant Examiner*—Robert M. Bauer
*Attorney, Agent, or Firm*—John C. Moran

[57] ABSTRACT

A television (TV) system having provision for automatically compensating for signal distortion which would cause artifacts at the point where high- and low-resolution portions of an extended aspect ratio, high-definition TV display are joined together. Compensation parameters are calculated at the TV receiver in response to a known test pattern transmitted during the vertical retrace interval of the TV display and then accessed and utilized to compensate received active display signals. The compensation parameters are calculated by first converting Y, I, and Q signals for the test pattern into digital samples and then processing these digital samples in a digital signal processor unit. After the compensation parameters have been calculated by the digital signal processor, they are stored in a memory. The received active display signals are compensated by accessing the stored compensation parameters during the active display time. Each accessed compensation parameter is converted to an analog signal and is multiplied with received Y, I, and Q edge signals and combined with the center signals to compensate for distortions. In addition, the stored parameters are also averaged over a period of time to stop transient conditions from affecting the stored value of a compensation parameter.

14 Claims, 6 Drawing Figures

RECOMBINATION OF LOW- AND HIGH-RESOLUTION SEGMENTS OF AN EXTENDED ASPECT RATIO PICTURE

TECHNICAL FIELD

This invention relates to an apparatus within a television (TV) receiver that automatically compensates for signal distortion resulting from transmitter, transmission media, and receiver distortions. In particular, the apparatus pertains to the compensation required for filtering transients both in the transmitting and receiving of high-definition television signals with extended aspect ratio for the recombination of the high-resolution and low-resolution segments of the television picture.

BACKGROUND OF THE INVENTION

The aspect ratio defines the ratio of the width of the picture to its height. The aspect ratio of a commercial movie theater's screen is at least 5:3, and the conventional United States television picture, as specified by the National Television Standards Committee (NTSC) is 4:3. In addition, a commercial movie theater's picture is of higher resolution than that of conventional United States television. An approach for providing high-definition television with an extended aspect ratio is described in the U.S. patent application of J. L. LoCicero, et al., Case LoCicero-Pazarci-Rzeszewski 2-2-6, entitled, "Compatible High-Definition Television With Extended Aspect Ratio", filed June 29, 1984, Ser. No. 626,453. This application discloses a television system having a fully compatible high-definition signal with extended aspect ratio information receivable at conventional resolution by conventional TV receivers without auxiliary apparatus with one TV channel carrying the conventional TV signal, while high-frequency luminance and chrominance information plus extended aspect ratio information are provided in a second TV channel. The picture displayed by this TV system consists of a high-resolution center segment and two low-resolution edge segments. Since the human eye tends to focus on the center of the TV screen, the perception is that the viewer is observing a high-resolution extended aspect ratio picture and, in general, does not detect the low-resolution in the two edge segments. The LoCicero, et al., application discloses a TV receiver which, after reception of the transmitted signal, decodes high- and low-resolution luminance and chrominance information into individual signals and then recombines the low- and high-resolution luminance signals and the low- and high-resolution chrominance signals by gating and summing these signals at the appropriate times.

Whereas, the straight-forward approach utilized by the LoCicero, et al., application gives adequate performance where the transmitter and receiver filters are well known and the transmission media is stable, the filters used in the transmitter and receiver as well as the transmission media can cause distortion to appear at the point on the screen where the low-resolution and high-resolution segments come together. One of the reasons for the distortion is the use of filters in both the receiver and transmitter with flat pass-band responses and high stop-band attenuation characteristics. Such filters generally have oscillatory transient responses with overshoots and undershoots. The other processing blocks within the transmitter and receiver also have transient responses. By the time the transmitted signal is received at the decoder portion of the TV receiver, since both the edge and center information have been passed through a number of processing blocks with different transient responses, the abrupt change at the joining point between the low-resolution edge portion of the picture and the high-resolution center portion of the picture has been corrupted by the transient responses of the different processing units. If this corruption is significant, then the mere gating and summing of the edge and center luminance and chrominance information will leave visible and annoying artifacts appearing at the joint.

Therefore, there exists a need for apparatus that can eliminate or compensate for the transients due to the processing units in both the transmitter and the receiver of a television signal such that the low-resolution edge and high-resolution center segments of a picture in a high-definition television system with extended aspect ratio can be displayed without annoying artifacts in the proximity of the joint between the different segments.

SUMMARY OF THE INVENTION

The foregoing problem is solved and a technical advance is achieved in accordance with the principles of this invention incorporated in a structural embodiment in which high-definition television display signals with improved aspect ratio information are processed so as to display a picture without distortion at the points where the low- and high-resolution segments of the picture join by the utilization of a test signal that is transmitted during the vertical retrace interval of the TV signal. Advantageously, the test signal is a horizontal line of a known test pattern and a circuit within a TV receiver is responsive to reception of the transmitted test pattern for calculating compensation parameters that can be used to remove distortions introduced during the transmission of the display signals. The calculated compensation parameters are stored in a parameter memory; and then, during the reception of the display signal, the compensation parameters are accessed from the memory and utilized to correct the display signal. In addition, the calculating circuit is responsive to the start of the vertical retrace interval of the display and reception of the test pattern for calculating the compensation parameters.

Advantageously, the test pattern has an edge portion and a center portion and an analog-to-digital converter is responsive to the edge portion for converting the edge signal into a plurality of digital edge samples and converting the center portion into a plurality of digital center samples. In addition, a memory is utilized for storing a plurality of digital constant samples within the television receiver representing the test pattern before transmission. Each compensation parameter is calculated by subtracting one of the digital center samples from one of the digital constant samples and then dividing this result by one of the edge samples.

Advantageously, as each compensation parameter is calculated, it is stored in a memory. As the display signal is received, the stored compensation parameters are transformed into an analog signal, and the analog signal is multiplied with the decoded edge signal and added to the decoded center signal to compensate the display.

Advantageously, before the calculated parameter is stored in the parameter memory, it is compared with the parameter stored during a previous vertical retrace interval. If the difference between the two parameters exceeds a predetermined value, if the difference between the two parameters exceeds a predetermined value, a new parameter is stored in the parameter memory that is equal to a first constant multiplied times the stored parameter added to the results of a second constant multiplied times the new sample. However, if the difference does not exceed the predetermined value, the average between the present calculated parameter and the previous stored parameter is determined and stored in the parameter memory as the new stored parameter.

BRIEF DESCRIPTION OF THE DRAWING

In general, system elements, when first introduced on a figure, are such designated with a number that uses the figure number as the most significant digits of the element number.

DETAILED DESCRIPTION

Figure 1:
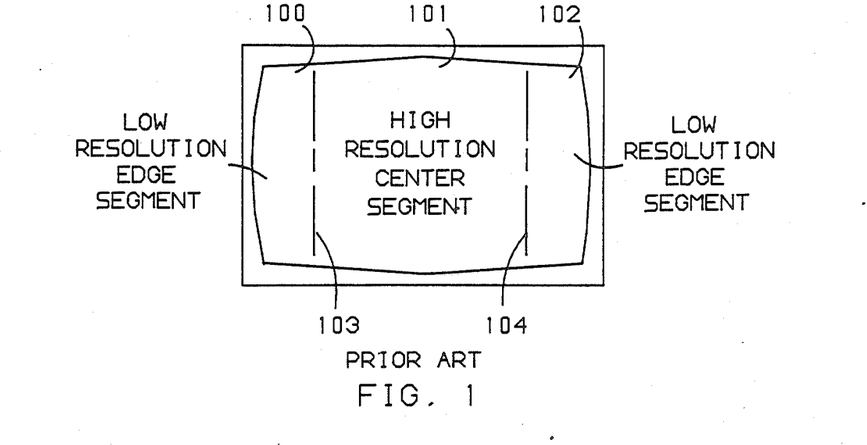
FIG. 1 is an illustrative TV picture display on a high-definition television receiver with extended aspect ratio.

The following describes an apparatus that is used to recombine the high- and low-resolution information segments of a video display with extended aspect ratio. As illustrated in FIG. 1, such a display comprises low-resolution edge information segments 100 and 102, and high-resolution center information segment 101. The recombination apparatus joins the information segments along lines 103 and 104 so that no undesirable artifacts appear in the display along lines 103 and 104. The apparatus functions by using the transmission of a known video signal from a transmitter to a receiver during the vertical retrace time of the receiver. Recombination circuits in the receiver are responsive to the known signal for calculating correcting parameters that are subsequently used on a line-by-line basis to compensate the received display edge information for transients introduced by the various transmitter and receiver circuits during the communication of the video signal.

Figure 2:
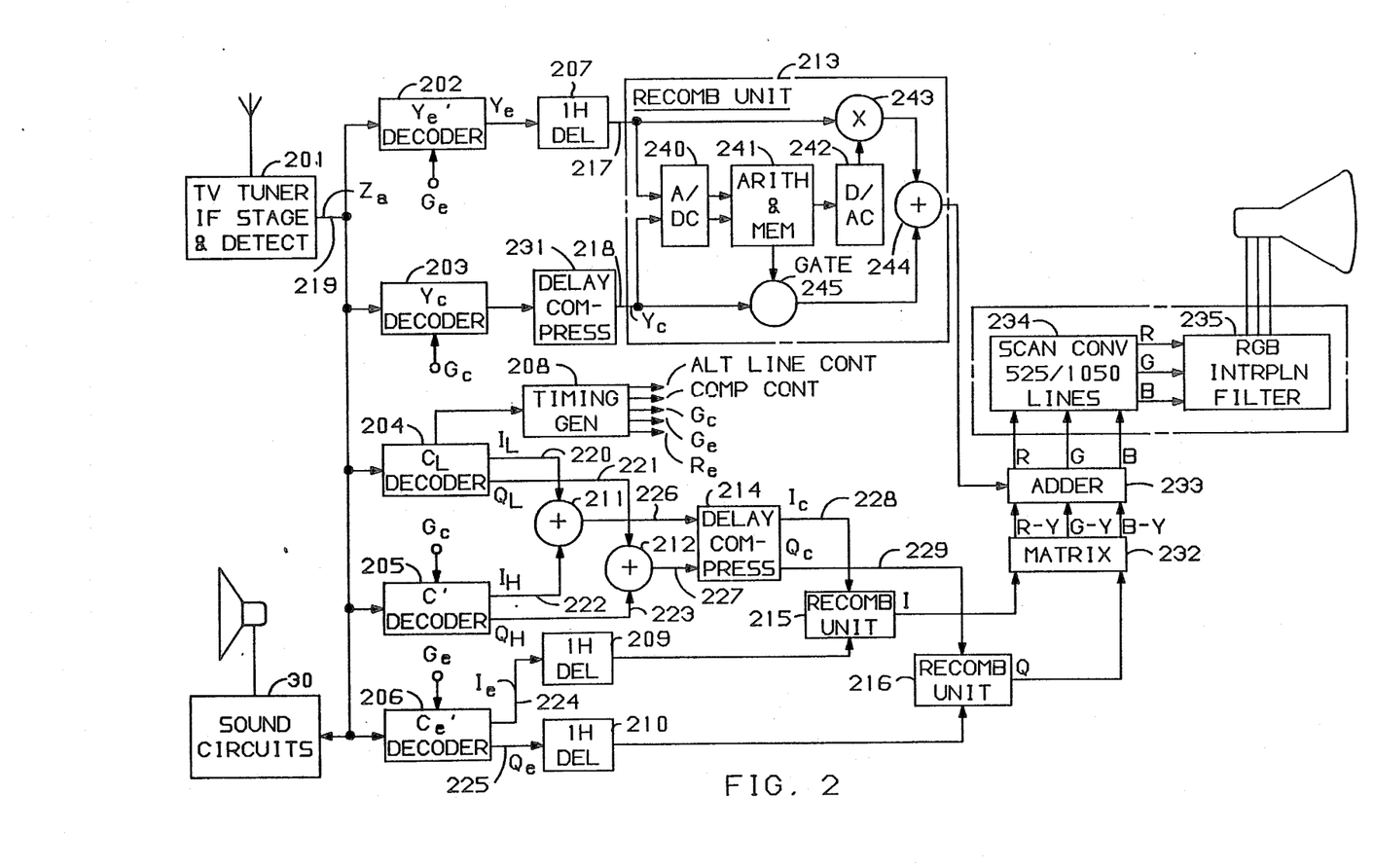
FIG. 2 is the circuit for doing the above.

A system for receiving a high-definition signal with extended aspect ratio and displaying the picture illustrated in FIG. 1 is shown in FIG. 2. The manner in which the video display information is initially encoded for transmission at the transmitter and then decoded at the receiver illustrated in FIG. 2 is discussed in depth in the previously mentioned LoCicero, et al., application which is hereby incorporated by reference. As discussed in the latter application, the transmitted video signal, $Z_a$, comprises high- and low-frequency luminance center information, $Y_c$, low-frequency edge luminance information, $Y_e$, low-frequency center chrominance information, $I_L$ and $Q_L$, high-frequency center chrominance information, $I_H$ and $Q_H$, and low-frequency edge chrominance information, $I_e$ and $Q_e$. Recombination units 213, 215, 216 are responsive to center and edge information to recombine this information for display by blocks 232 through 235. For example, recombination unit 213 is responsive to the edge luminance signal, $Y_e$, on conductor 217 and the center luminance signal, $Y_c$, on conductor 218 to recombine these signals and to transfer the resulting signal to adder 233 for display. Recombination unit 213 is illustrated in its major blocks in FIG. 2. Recombination units 215 and 216 are similar in design.

With respect to the luminance signals $Y_e$ and $Y_c$, recombination unit 213 calculates a series of compensation parameters which, when multiplied with the received edge luminance signal, $Y_e$, and the result added to the received center luminance signal, $Y_c$, compensates for the overshoots and undershoots in $Y_e$ and $Y_c$ caused by the transient responses of the filters in both the transmitter and the receiver as well as those due to the transmission media. After calculation, these parameters are stored internally in arithmetic and memory circuit 241. The calculations are based on the following equations. Since both the edge and center luminance signals have been distorted by filter transients, the original value of the combined luminance test reference signal, $Y_O$, before encoding at the transmitter can be recovered at the receiver by the following:

$$Y_O(n) = m(n)Y_e(n) + M(n)Y_c(n) \tag{1}$$

This equation represents the signals as a series of digital samples of the analog luminance signal and $Y_O$ is limited in bandwidth to the lowest bandwidth of either $Y_e$ or $Y_c$. $Y_e(n)$ and $Y_c(n)$ are the received edge and center test reference signals, respectively. The objective of equation 1 is to correct the distortion in $Y_e(n)$ and $Y_c(n)$ caused by transients from all intermediate systems such that their weighted sum is equal to the original value $Y_O(n)$. Equation 1 defines an overspecified system, i.e., two variables with only one equation. Given $Y_O(n)$, $Y_e(n)$, and $Y_c(n)$, an equality can be generated by determining $M(n)$ and $m(n)$. This can be done by setting either $M(n)$ or $m(n)$ to an arbitrary, finite, non-zero value and then solving for the other variable. By choosing $M(n)=1$, the complexity of an additional multiplication is avoided and the shorter of the segments (the edge segment) is chosen to be scaled.

Setting $M(n)=1$ allows equation 1 to be solved for $m(n)$ as follows:

$$m(n) = [Y_O(n) - Y_c(n)]/Y_e(n) \tag{2}$$

Given equation 2, $m(n)$ can be evaluated by knowing the value of $Y_O(n)$ before encoding at the transmitter. The system calculates $m(n)$ by transmitting $Y_O$ as a known reference signal during the vertical retrace interval. This reference signal illustratively may be a flat field signal representing a gray tone. Since this signal is known, the recombination unit can use the values of this known signal to evaluate the equation for $m(n)$. Recombination unit 213 functions by the analog-to-digital converter A/DC circuit 240 converting both the $Y_e$ and $Y_c$ signals to the digital samples of $Y_e(n)$ and $Y_c(n)$, respectively, for use in solving equation 2. The known signal, $Y_O(n)$, is stored as a series of constants within the arithmetic and memory circuit 241. The latter unit also calculates the formula for $m(n)$ using the stored constant $Y_O(n)$ and the received values for $Y_e(n)$ and $Y_c(n)$. During the proper times in the active line scans, arithmetic and memory 241 transmits the parameters, $m(n)$, to the digital-to-analog converter D/AC circuit 242 which converts these digital samples into an analog signal.

Multiplier circuit 243 is responsive to the output of the D/AC 242 to multiply these parameters with the $Y_e$ signal from delay block 207 thus correcting the received $Y_e$ signal. During the edge time, the $Y_c$ signal is not allowed to be transmitted to the summing circuit 244 because gate 245 is disabled by circuit 241. During the active center time and the transient times, circuit 241 enables the communication of $Y_c$ to circuit 244. Together, the circuits 243 through 245 implement the equation for Y(n) in real time during the active line time.

Figure 3:
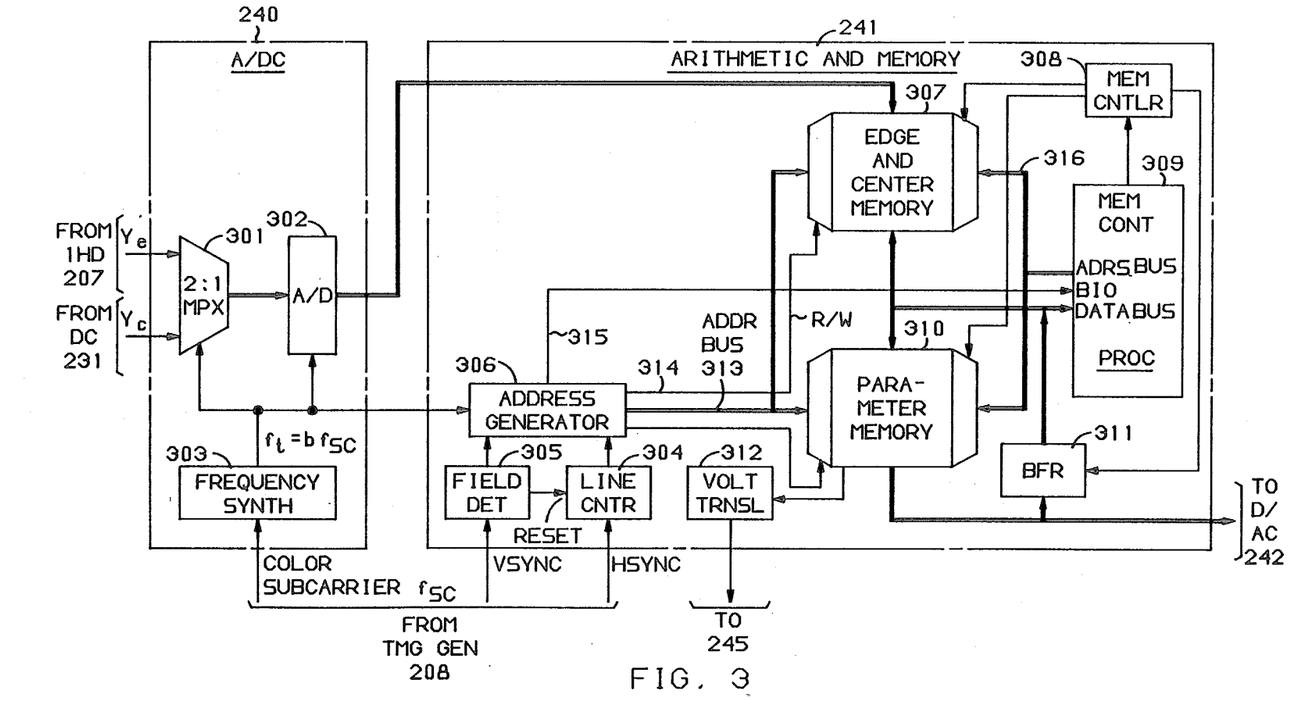
FIG. 3 illustrates in greater details A/DC 240 and arithmetic and memory 241 of FIG. 2.

Elements 240 and 241 of recombination unit 213 are illustrated in greater detail in FIG. 3. A/DC 240 consists of multiplexer 301, A/D 302, and frequency synthesizer 303. Arithmetic and memory unit 241 comprises elements 304 through 312. Edge and center memory 307 stores the digital samples of the $Y_e$ and $Y_c$ signals from A/DC 240 until these samples can be processed by processor 309. Processor 309 may illustratively be a TMS320M10 that is manufactured by the Texas Instrument Corporation. Processor 309 utilizes the contents of edge and center memory 307 to calculate the m parameters which it then stores in parameter memory 310. Line counter 304, field detector 305, and address generator 306 are used to generate the control signals for storing the digitized signals $Y_e(n)$ and $Y_c(n)$ in edge and center memory 307 and for accessing the m parameters in parameter memory 310 so that these stored values can be utilized by D/AC 242 and gate 245. In addition, elements 304, 305, and 306 generate the information to notify processor 309 when the values for the test line have been stored in memory 307.

Figure 4:
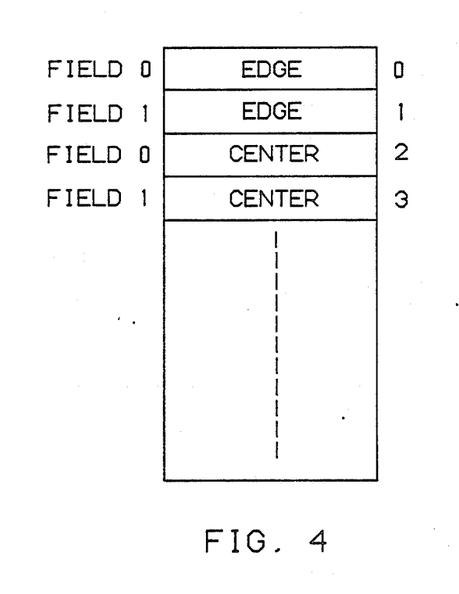
FIG. 4 illustrates the contents of memory 307 of FIG. 3.

One frame of display requires the transmission of two fields of information, field 0 and field 1. The two fields are then interlaced to form the frame as perceived by the viewer of the TV receiver. The test line is transmitted during the vertical retrace interval of each field; however, the m parameters are calculated once per frame. During each transmission of a test line, multiplexer 301 and A/D 302 convert half of the information available for the $Y_e$ and $Y_c$ signals into digital values which are then stored in the edge and center memory 307. Half of the information contained in the $Y_e$ and $Y_c$ signals are converted during the test line transmitted during the vertical retrace interval of field 0 and the remaining half of the test line information is converted during the transmission of the test line during the vertical retrace interval of field 1. FIG. 4 illustrates the manner in which this information is stored in edge and center memory 307. Address generator 306 in response to signals from the line counter 304 and field detector 305 generate address signals for transmission on bus 313 and write signals transmitted on conductor 314 for writing the information from A/D 302 into memory 307 as illustrated in FIG. 4. Generator 306 stores the edge information for field 0 in block 0 of FIG. 4. The center information field 0 in block 2, the edge information for field 1 in block 1, and the center information for field 1 in block 3. During each test line, the $Y_e$ and $Y_c$ signals are individually written into memory 307 at an illustrative rate of 10.7 MHz.

After the samples of the test line for field 1 have been written into memory 307, address generator 306 transmits a signal via conductor 315 to processor 309. Processor 309 is responsive to the signal on conductor 315 to execute the program illustrated by the flow chart of FIG. 5. This program performs the calculations defined by the previously mentioned equation 2. Processor 309 accesses the digitized $Y_e$ and $Y_c$ signals (e(n) and c(n) in FIG. 5) stored in memory 307, via bus 316 and memory controller 308 to calculate the m parameters. As the parameters are calculated, processor 309 stores these parameters in parameter memory 310 again by utilizing bus 316 and memory controller 308. The results of the calculations by processor 309 stored in parameter memory 310 define correction parameters for a complete horizontal line during the active display time. Part of the information stored in parameter memory 310 is the m parameters and information to properly gate the center information into summer 244. The samples in parameter memory 310 corresponding to center time contain a "0" for the m parameters which disables the $Y_e$ signal from being communicated through gate 243 to summer 244 and a "1" for controlling the communication of the $Y_c$ signal. After translation by voltage translation circuit 312, the latter "1" enables the $Y_c$ signal to be commuicated through gate 245 to summer circuit 244.

Figure 5:
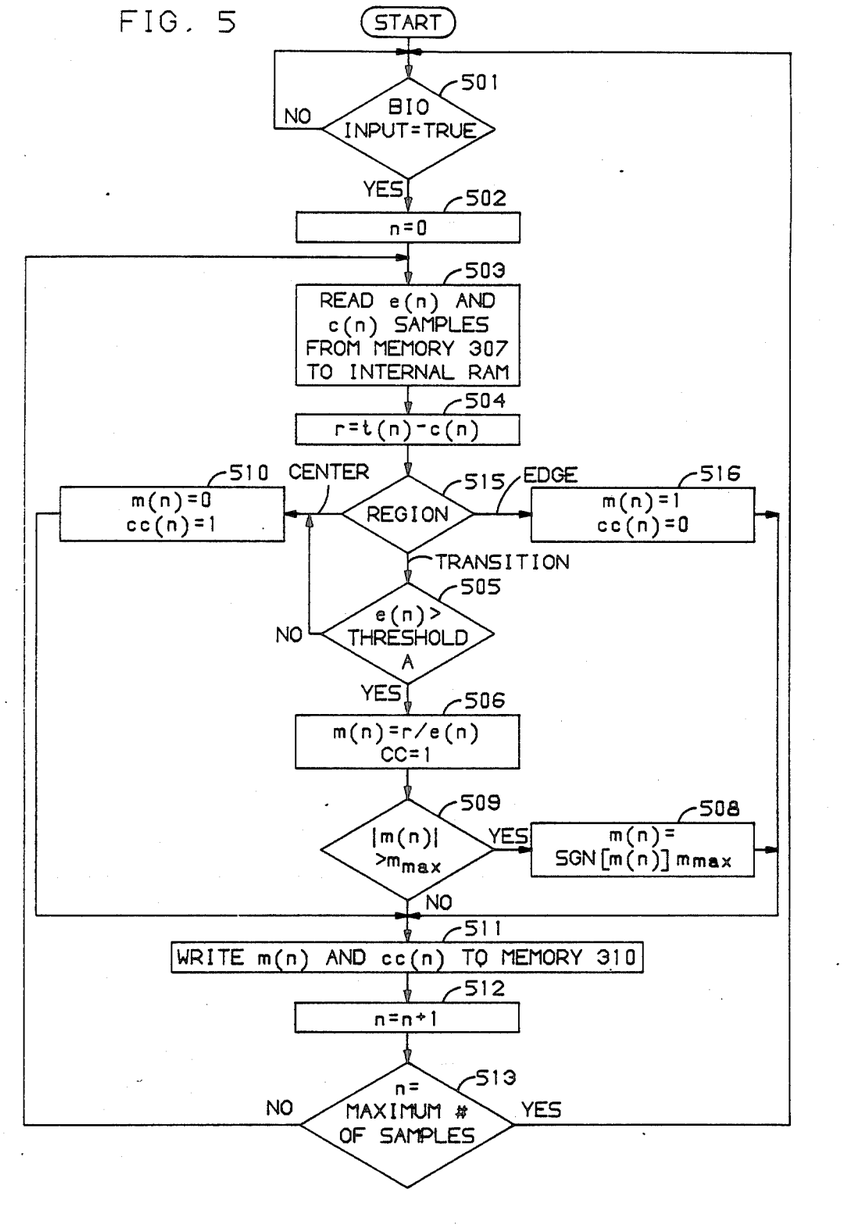
FIG. 5 illustrates, in flow chart form, a program for controlling the operation of processor 309 of FIG. 3.

The program illustrated in FIG. 5 is now considered in greater detail. When all of the samples of the test line for field 1 have been written into memory 307, address generator 306 transmits a signal via conductor 315 to processor 309. The program illustrated in FIG. 5, that is controlling the operation of processor 309, detects the transmission of the signal on conductor 315 by continuously checking the BIO (branch on I/O) input of processor 309 for a true state indicated by the presence of a signal on conductor 315. Once the latter signal is detected at the BIO input, the variable containing the sample count, n, is set to 0 in block 502. Once the sample count, n, has been set to 0, the program calculates the values for the correction parameters m(n) and control parameters cc(n). The latter parameters control the operation of gate 245. Blocks 503 through 513 calculate the values for m(n) and cc(n) for the entire test line and store these values in parameter memory 310. The original values of the test line before transmission are known and are stored as a series of constants, t(n), in the internal program memory of processor 309.

For each sample of e(n) and c(n) the following steps are performed. First, the latter samples are read from memory 307 into internal RAM locations of processor 309 by block 503. Then, the intermediate value r is calculated by block 504. The latter calculation performs the subtraction of the center segment sample from the original test line sample as indicated in equation 2.

Next, the value of n is interrogated by block 515 to determine the approximate position within the horizontal line for which a compensation parameter is being calculated. Unless the parameter falls within transition region around joint 103 or 104, as illustrated in FIG. 1, block 515 determines that it is either in the center or the edge portion of the display illustrated in FIG. 1. Analyzing the largest transient, i.e., that of the edge signal, the transition region for the present sampling frequency may illustratively be defined as extending into the edge portion and the center portion by a number of samples equal to 15 divided by the $-3$ dB bandwidth of the edge signal in MHz. If the samples are determined to be within the center region, then block 510 is executed resulting in the m(n) parameter being set equal to 0 and the control signal, cc(n), being set equal to "1". Resulting in that during the active display times, the $Y_e$ signals are inhibited by gate 243 and the $Y_c$ signals are transmitted through gate 245 to summer 244. If the sample is within the edge segments, block 516 is executed setting the m(n) parameter equal to 1 and the control signal, cc(n), equal to "0". Resulting in that during the active display time, the $Y_e$ signals are transmitted by gate 243 to summer 244, and the $Y_c$ signals are inhibited by gate 245.

If block 515 determines that the sample is within the transition regions, the edge signal, e(n), is tested against a threshold value, threshold A, to determine whether or not the edge sample is large enough to be utilized in the calculation of equation 2. If the edge sample is not greater than threshold A, then block 510 is executed having the previously described results. If the edge signal is greater than threshold A, then block 506 is executed resulting in the m(n) being set equal to r/e(n) and cc(n) being set equal to "1". Illustratively, threshold A can have a value equal to 3% of the peak-to-peak range of the edge signal.

The calculated value m(n) is then checked in block 509 against a maximum value, $m_{max}$ to verify that it is not too large. If the calculated value is greater than the maximum, then the calculated value m(n) is set equal to $\pm m_{max}$ by block 508. Illustratively, $m_{max}$ may have a value in the range of 2 to 5. After the above calculations and checks have been performed, the resulting values for m(n) and cc(n) are written into parameter memory 310 by block 511. Blocks 512 and 513 then increment n and determine if all these samples have been utilized. If all the samples have been utilized, then control is transferred back to block 501; however, if samples remain to be utilized, control is transferred to block 503.

Figure 6:
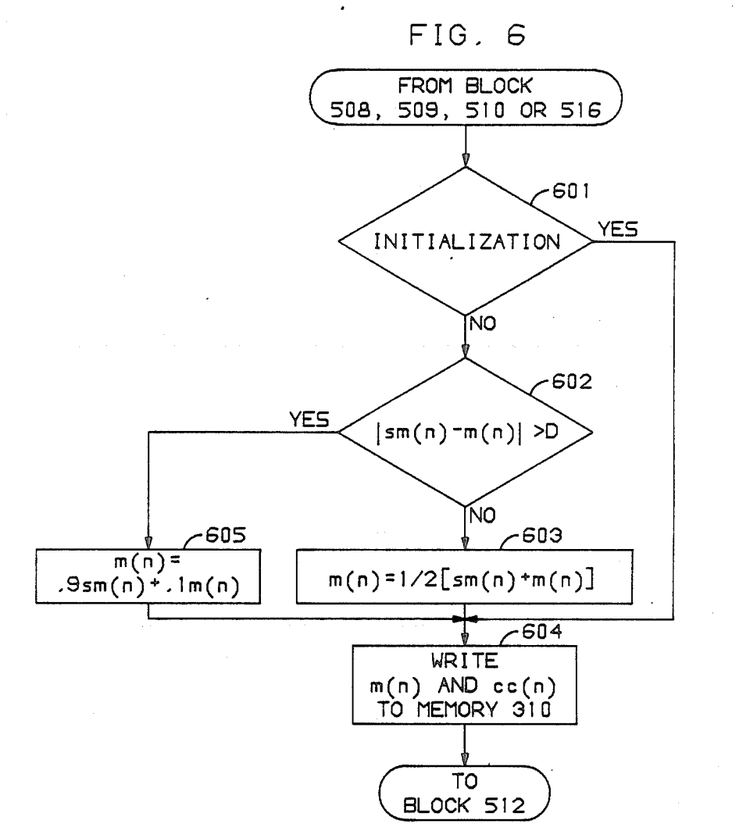
FIG. 6 illustrates, in flow chart form, a modification to the program of FIG. 5 to allow averaging of the compensation parameters stored in parameter memory 310.

FIG. 6 illustrates a modification to the program of FIG. 5 that allows averaging to be utilized to compensate for the possibility of transient noise causing erroneous values of m(n) to be stored in parameter memory 310. Block 511 of FIG. 5 is replaced with the blocks illustrated in FIG. 6. During the initialization of the system, the latter is detected by block 601 and the calculated values for m(n) and cc(n) are stored into parameter memory 310 as was previously described for FIG. 5. Once stored, the m(n) values are referred to as sm(n). The next time that the parameters are calculated, block 602 is executed. The latter block compares the stored value, sm(n), from parameter memory 310, with the newly calculated value m(n) to determine if the difference is greater than the value D. D may illustratively have a value equal to 25% of the peak-to-peak range. If the difference is greater than D, which indicates that the present calculated value is incorrect, then block 605 is executed and the value calculated by block 605 is written into parameter memory 310. Block 605 allows the calculated value to slowly change with a number of samples in order to correct an erroneous value. However, if the difference is less than D, then the average is taken between the values of sm(n) and m(n) by block 603, and the average is written into parameter memory 310 by block 604.

It is to be understood that the above-described embodiment is merely illustrative of the principles of the invention and that other arrangements may be devised by those skilled in the art without departing from the spirit and scope of the invention.

What is claimed is:

1. A system for compensating a video signal for distortion induced during transmission reception using a test pattern signal transmitted during the vertical retrace interval and comprising an edge pattern signal and a center pattern signal and said video signal having a vertical retrace interval, said system comprises:

means responsive to said edge pattern signal for converting said edge pattern signal into a plurality of digital edge samples and said center pattern signal into a plurality of digital center samples;

means for storing a plurality of digital constant samples representing said test pattern signal before transmission;

means for subtracting each of said digital center samples from an individual one of said digital constant samples to produce one of a plurality of output signals; and means responsive to said output signals of said subtracting means for dividing said each of said output signals by one of said digital edge samples thereby calculating a plurality of compensation parameters.

means responsive to said compensation parameters for storing said compensation parameters; and means responsive to display portions of said high-definition video signal for correcting said portions by utilizing the stored compensation parameters.

2. The system of claim 1 wheein said converting means is further responsive to a start of said vertical retrace interval for converting said edge pattern signal.

3. The system of claim 2 wherein said correcting means comprises means responsive to said stored compensation parameters for transforming said stored compensation parameters to an analog signal; and means responsive to said analog signal and received edge portion of said high-definition video signal for multiplying said edge portion with said analog signal for display purposes.

4. A system for compensating a received video signal having edge and center portions and a vertical retrace interval and a received test pattern signal transmitted during said vertical retrace interval of the received video signal, said system comprises:

means responsive to the reception of said test pattern signal for calculating compensation parameters;

means responsive to the calculated compensation parameters for storing said compensation parameters; and means responsive to said edge and center portions of said received video signal for correcting the transition between said edge and center portions by utilizing the stored compensation parameters.

5. The system of claim 4 wherein said calculating means is responsive to a start of said vertical retrace interval and said test pattern signal for calculating said compensation parameters.

6. The system of claim 5 wherein said test pattern signal comprises an edge pattern signal and a center pattern signal and said calculating means comprises means responsive to said edge pattern signal for converting said edge pattern signal into a plurality of digital edge samples and said center pattern signal into a plurality of digital center samples;

means for storing a plurality of digital constant samples representing said test pattern signal before transmission;

means for subtracting one of said digital center samples from one of said digital constant samples; to produce an output and means responsive to the output of said subtracting means for dividing said output by one of said digital edge samples thereby generating one of said compensation parameters.

7. The system of claim 6 wherein said correcting means comprises means responsive to said stored compensation parameters for transforming said stored compensation parameters to an analog signal; and means responsive to said analog signal and received edge portion of said high-definition video signal for multiplying said edge portion with said analog signal for display purposes.

8. A system for compensating a received video signal having a vertical retrace interval and using a received test pattern signal transmitted during said vertical retrace interval of the received video signal, said received video and test pattern signals comprising edge and center luminance portions and edge and center first and second chrominance portions; said system comprises:

means responsive to reception of said test pattern signal for decoding said edge luminance portion and said center luminance portion of said test pattern signal for calculating luminance compensation parameters;

means responsive to the calculated luminance compensation parameters for storing said luminance compensation parameters;

means responsive to said edge and center luminance portions of said received video signal for correcting said center and edge luminance portions of said received video signal by utilizing the stored luminance parameters;

means responsive to the reception of said test pattern signal for decoding center and edge first chrominance portions of said test pattern signal;

means responsive to said decoded center and edge first chrominance portions of said test pattern signal for calculating first chrominance compensation parameters;

means responsive to the calculated first chrominance compensation parameters for storing said first chrominance compensation parameters;

means responsive to said first chrominance portions of said received video signal for correcting said first chrominance portions of said received video signal by utilizing the stored first chrominance compensation parameters;

means responsive to the reception of said test pattern signal for decoding said center and edge second chrominance portions;

means responsive to the decoded second chrominance portions of said test pattern signal for calculating second chrominance compensation parameters;

means responsive to the calculated second chrominance compensation parameters for storing said second chrominance compensation parameters;

means responsive to said second chrominance portions of said received video signal for correcting said displayed second chrominance portions by using the stored second chrominance compensation parameters; and means responsive to said corrected luminance, first chrominance, and second chrominance portions for displaying said corrected luminance, first chrominance, and second chrominance portions.

9. The system of claim 8 wherein said luminance calculating means comprises:

means for converting said decoded edge luminance portions of said test pattern signal to digital edge luminance samples;

means for storing said digital edge luminance samples;

means responsive to said decoded center luminance portion of said test pattern signal for converting the latter to digital center luminance samples;

means for storing said digital center luminance samples;

means for storing digital luminance constant samples representing said edge and center luminance test pattern portions before transmission;

means for subtracting one of said digital center luminance samples from one of said digital luminance constant samples; to produce an output and means responsive to the output of said subtracting means for dividing said output by one of said digital edge luminance samples thereby generating one of said luminance compensation parameters.

10. The system of claim 8 wherein said luminance correcting means further comprises means responsive to luminance portions of said received video signal for accessing said stored luminance compensation parameters;

means for converting the accessed luminance compensation parameters to an analog signal; and means for multiplying said analog signal times said edge luminance portion of said received video signal.

11. A system for compensating a received video signal having a vertical retrace interval and a received test pattern signal transmitted during said vertical retrace interval of the received video signal, said system comprises:

means for storing compensation parameters;

means responsive to the reception of said test pattern signal for calculating present compensation parameters;

means for averaging said stored compensation parameters and said present compensation parameters;

means responsive to the result of said averaging for storing said result as said stored compensation parameters; and means responsive to said received video signal for correcting said received video signal by utilizing the stored compensation parameters.

12. The system of claim 11 wherein said calculating means is further responsive to a start of said vertical retrace interval and said test pattern signal for calculating said present compensation parameters.

13. The system of claim 12 having a plurality of digital constant samples representing said test pattern signal before transmission wherein said test pattern signal comprises an edge pattern signal and a center pattern signal and said calculating means comprises means responsive to said edge and center pattern signals for converting said edge pattern signal into a plurality of digital edge samples and said center pattern signal into a plurality of digital center samples;

means for subtracting one of said digital center samples from one of said digital constant samples to produce an output; and means responsive to said output of said subtracting means for dividing said output by one of said digital edge samples thereby generating one of said present compensation parameters.

14. The system of claim 11 wherein said averaging means further comprises means for subtracting said present compensation parameters from said stored compensation parameters;

means for multiplying a first constant with said stored compensation parameters to produce a first set of values;

means for multiplying a second constant with said present compensation parameters to produce a second set of values;

means for adding said first and second sets of values to produce a third set of values; and means for replacing said stored compensation parameters with said third set of values when said difference between said stored compensation parameters and said present compensation parameters exceed a threshold value.

* * * * *

UNITED STATES PATENT AND TRADEMARK OFFICE
CERTIFICATE OF CORRECTION

PATENT NO. : 4,694,328

DATED : September 15, 1987

INVENTOR(S) : Joseph L. LoCicero

It is certified that error appears in the above-identified patent and that said Letters Patent is hereby corrected as shown below:

Column 7, line 64 "during transmission reception" should read "during transmission and reception"

Column 10 line 31 "means for storing compensation" should read "means for storing stored compensation".

Signed and Sealed this

Fifteenth Day of September, 1992

Attest:

DOUGLAS B. COMER

Attesting Officer

Acting Commissioner of Patents and Trademarks